Sept. 9, 1941. J. D. LANGDON 2,255,322
DIAPHRAGM AND PRESSURE OPERATED VALVE
Filed March 26, 1940
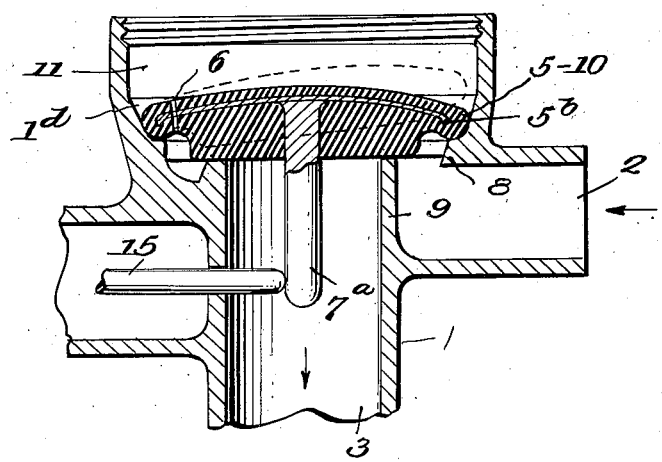
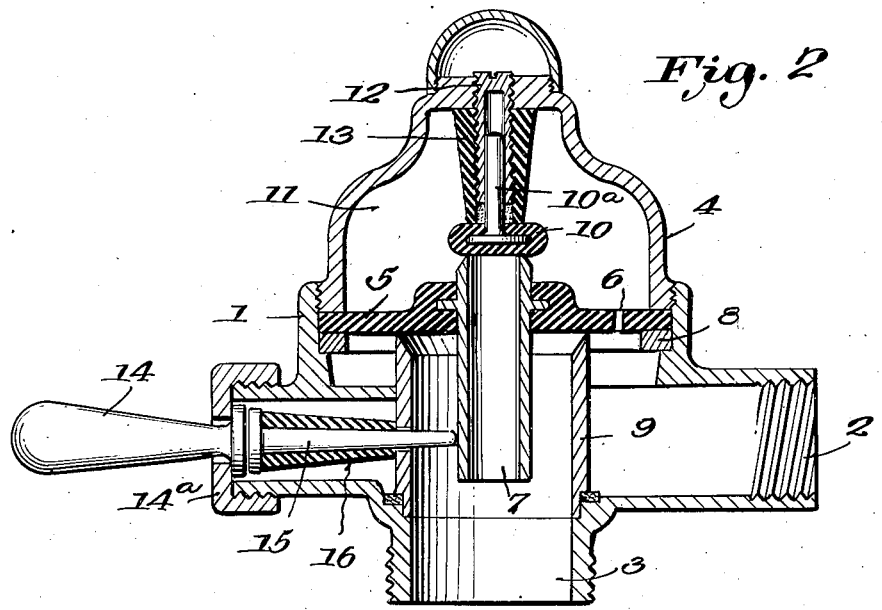
J. D. Langdon
Inventor Patented Sept. 9, 1941

2,255,322

UNITED STATES PATENT OFFICE 2,255,322

DIAPHRAGM AND PRESSURE OPERATED VALVE

Jesse D. Langdon, Los Angeles, Calif.

Application March 26, 1940, Serial No. 326,089

3 Claims. (Cl. 137—93)

This is a continuation in part of Serial No. 169,527 filed October 18, 1937 for Diaphragm and pressure operated valves, now Patent No. 2,212,607 of August 27, 1940.

My invention relates to flush valves for toilets, liquid measuring and pressure operated valves, and the like, with the following objects and purposes in view:

First, the organization of a valve structure using a diaphragm type main valve member wherein the direct tipping of said main valve member causes the valve to open.

Second, the provision of a simplified structure eliminating the mechanical guides usually provided for the main valve member of the diaphragm type pressure operated valves.

Third, the elimination of the relief or secondary valve of the tipping type usually used in the conventional valve structure of the kind described.

Fourth, the construction of a simple, new and novel valve device economical of manufacture.

Fifth, the design of a valve body structure capable of being conveniently forged instead of cast as is the usual manner of production for valves of the kind described.

Other and further objects will appear as the specification proceeds as shown by the drawing, which is for the purpose of illustration only; changes and modifications which may be necessary in reduction to practice are anticipated within the scope of what is claimed.

Of the drawing:

Figure 1 is a fragmentary sectional view of a diaphragm in body 1 with cap removed, showing diaphragm tipping elements used for the purpose of relieving the pressure chamber 11 to open the valve.

Figure 2 shows a modification of Figure 1, wherein the diaphragm tipping element comprises a hollow stem forming a relief port.

Figure 1 shows a rubber-like diaphragm 5—10 having a metal reinforcement 5b with a stem 7a extended downwardly therefrom and adapted to tip the diaphragm similar to the stem 7 as of Figure 2; the diaphragm 5—10 being tipped by the impingement of plunger 15 thereagainst relieves the pressure from chamber 11.

The outer periphery of diaphragm 5—10 being made of rubber-like material normally rests on a shelf or ring 8 when the valve is closed; the inner wall of the valve body 1 being tapered at 1d becoming narrower at the bottom next to the shelf 8 is of sufficient shallowness and of a diameter to permit the outer periphery of 5b of the diaphragm 5—10 to clear the inner wall 1d of the body 1 when the diaphragm is tipped, causing said diaphragm to act as a relief valve as well as a valve member. When plunger 15 is released the periphery of diaphragm 5—10 impinges the wall 1d to seal against any leakage therearound. Water entering into the pressure chamber 11 via bypass 6 serves to force the diaphragm towards seat 9 until the flexible periphery 5b rests on the shelf or ring 8 which occurs simultaneously with the closing of the valve. The modification as of Figure 2 is constructed and operates as follows:

Figure 2 includes a body 1, an inlet 2, an outlet 3, a cap 4 which retains a diaphragm valve member 5 having a bypass 6 disposed through said diaphragm and including a relief valve port constituted by tube 7 extending downwardly therefrom, said diaphragm 5 being supported at its outer periphery by an inserted ring 8 where the body of the valve is forged, said shelf or ring 8 being cast integral with the body 1 when a casting is used. The diaphragm 5 normally rests on a valve seat surrounding the inner side of the outlet 3 and is shown inserted into the body against a packing washer. A relief valve 10 is disposed in the pressure chamber 11 formed between cap 4 and diaphragm 5 and has a stem 10a extending into a combined tubular adjusting screw and stem guide 12, threadedly disposed through cap 4 and surrounded by a rubber packing sleeve 13. An operating handle 14 flanged at its inner end is held in place by nut 14a and impinges a flanged plunger 15 which is surrounded by a rubber sleeve and packing member 16 which functions in place of both a spring and packing.

When the handle 14 is operated, the plunger 15 impinges the combined tubular relief valve port and stem 7 which is integral with and tips diaphragm 5; the relief valve 10 being rigidly held in place the seat formed at the upper end of the port 7 is moved away from said relief valve 10 relieving the pressure in chamber 11 to open the valve.

Since the relief valve 10 is rigidly guided the diaphragm 5 serves the functions of the conventional relief valve ordinarily used in the usual type of pressure operated valve. Thus it will be seen that the necessity for the usual guide elements attached to a diaphragm in a valve of the kind described is eliminated, as is also the usual tubular guard used to prevent the turbulence of liquid from holding the relief valve open. The valve as of Figure 2 is closed by entry of fluid into the pressure chamber 11, via bypass 6.

From the above description it will be seen that both species of pressure operated valves and diaphragms as of Figures 1 and 2 are provided with means to relieve the pressure chamber to open the valve by tipping the main valve member.

A rubber member as of packing sleeve 13, Figure 2, should be used in the structure as of Figure 1 to prevent the turbulence of liquid passing through the outlet 3 from tipping the diaphragm 5—10 and also further for the purpose of urging the diaphragm to its seat over outlet 3.

The entire cap assembly as of Figure 2 with the adjusting screw 12 surrounded by the resilient sleeve 13 made long enough to impinge the diaphragm 5—10 of Figure 1 will also provide means to adjust the distance to which the valve member or diaphragm 5—10 may rise before closing movement takes place.

Having described my invention and the improvements in diaphragms and pressure operated valves, I claim:

1. A pressure operated valve comprising a casing having an inlet and outlet, a pressure chamber between said inlet and outlet, one side of said pressure chamber provided with an exhaust port normally closed by a tiltable valve member forming one side of said pressure chamber and having a rim made of material flexible enough to deform and elastic enough to resume normal shape after being deformed, the periphery of said tiltable valve member contacting the inner circumference of said casing sealing said pressure chamber, relief valve means provided adjacent to and registering with said exhaust port, a bypass for pressure fluid communicating between said pressure chamber and said inlet, valve tilting means associated with said tiltable valve member, said tiltable valve member registering with said outlet to close same and capable of being tipped to exhaust said pressure chamber and open said outlet simultaneously, said tiltable valve member serving the multiple purpose of sealing said pressure chamber, opening and closing the exhaust port of said pressure chamber as well as said outlet.

2. A pressure operated valve as described in claim 1 having the tiltable valve member formed with a central stem projecting therefrom, said tiltable valve member being reenforced closely adjacent the flexible periphery thereof and the inner circumference of the casing forming the seat of the relief valve means with which the outer portion of said tiltable valve member cooperates to complete the relief valve means.

3. A pressure operated valve as described in claim 1 having a hollow stem projecting from the tiltable valve member and forming the exhaust port and the seat of the relief valve means, a centrally disposed relief valve member in said pressure chamber registering with said relief valve seat, said hollow stem forming the valve tilting means whereby said exhaust port and outlet are opened.

JESSE D. LANGDON.